United States Patent
Cowley

(10) Patent No.: US 10,617,239 B2
(45) Date of Patent: Apr. 14, 2020

(54) FLOWER POT HOLDING ASSEMBLY

(71) Applicant: Carolyn Cowley, Comber (CA)

(72) Inventor: Carolyn Cowley, Comber (CA)

(*) Notice: Subject to any disclaimer, the term of this patent is extended or adjusted under 35 U.S.C. 154(b) by 177 days.

(21) Appl. No.: 15/629,744

(22) Filed: Jun. 22, 2017

(65) Prior Publication Data

US 2018/0368591 A1    Dec. 27, 2018

(51) Int. Cl.
*A47G 7/02* (2006.01)
*A01G 9/12* (2006.01)

(52) U.S. Cl.
CPC .............. *A47G 7/025* (2013.01); *A01G 9/122* (2013.01)

(58) Field of Classification Search
CPC .......... A01G 9/12; A01G 9/122; A01G 9/124; A01G 9/128; A01G 9/022; A01G 9/023; A01G 9/28; A01G 17/06; A01G 5/04; A47G 7/02; A47G 7/025; A47G 7/04; A47G 7/041
USPC .......................................... 47/39, 44, 45, 47
See application file for complete search history.

(56) References Cited

U.S. PATENT DOCUMENTS

| | | | | |
|---|---|---|---|---|
| 1,138,141 A | * | 5/1915 | Oliver | A47G 7/025 |
| | | | | 248/154 |
| 1,162,575 A | * | 11/1915 | Craig | A47G 7/025 |
| | | | | 248/153 |
| 1,712,986 A | | 5/1929 | Favata, Jr. | |
| 1,830,769 A | * | 11/1931 | James | A47G 7/025 |
| | | | | 248/154 |
| 2,203,632 A | | 6/1940 | Munsun et al. | |
| 2,504,902 A | * | 4/1950 | Strople | A47F 5/108 |
| | | | | 248/150 |
| 2,673,053 A | | 3/1954 | Kilian | |
| 3,655,158 A | * | 4/1972 | Smith, Jr. | B65F 1/141 |
| | | | | 248/154 |
| 4,099,354 A | * | 7/1978 | DePirro | E02D 27/42 |
| | | | | 249/151 |
| 4,631,861 A | * | 12/1986 | Wuthrich | A01G 9/12 |
| | | | | 47/70 |
| 5,179,799 A | * | 1/1993 | Hillestad | A01G 9/12 |
| | | | | 47/45 |
| D343,968 S | * | 2/1994 | Emalfarb | D11/143 |
| 5,412,905 A | | 5/1995 | Allison | |
| D362,762 S | * | 10/1995 | Emalfarb | D6/405 |
| D365,700 S | * | 1/1996 | Lee | D6/403 |
| D369,698 S | * | 5/1996 | Hollinger | D6/405 |
| D372,137 S | * | 7/1996 | Hollinger | D6/403 |
| 5,836,105 A | * | 11/1998 | Loosen | A47G 7/025 |
| | | | | 47/39 |
| 6,237,881 B1 | * | 5/2001 | Levesque | A47B 85/06 |
| | | | | 108/157.1 |
| 6,453,606 B1 | | 9/2002 | Shulman | |

(Continued)

FOREIGN PATENT DOCUMENTS

| | | | | |
|---|---|---|---|---|
| DE | 102012006685 A1 | * | 10/2013 | A01G 9/12 |
| FR | 561607 A | * | 10/1923 | A47G 7/025 |
| FR | 2614774 A1 | * | 11/1988 | A47G 7/025 |

*Primary Examiner* — Kathleen I Alker

(57) ABSTRACT

A flower pot holding assembly for inhibiting a flower pot from tipping over when the flower pot is displayed includes a plurality of spikes that is each manipulated to penetrate a support surface. A cage is coupled to the plurality of spikes. The cage rests on the support surface when the spikes penetrate the support surface. A flower pot is selectively positioned in the cage thereby inhibiting the flower pot from tipping over.

5 Claims, 3 Drawing Sheets

(56) References Cited

U.S. PATENT DOCUMENTS

| | | | |
|---|---|---|---|
| 6,533,140 B1* | 3/2003 | Freeman | A47G 23/0266 |
| | | | 220/475 |
| 6,895,712 B2 | 5/2005 | Gunderman et al. | |
| 7,018,090 B2* | 3/2006 | Moore | B01F 15/00733 |
| | | | 248/146 |
| D592,425 S | 5/2009 | Low | |
| 7,874,100 B2 | 1/2011 | Miller | |
| 9,625,085 B1* | 4/2017 | Jones | B25H 1/08 |
| 2004/0055212 A1* | 3/2004 | Ritter | A47G 7/047 |
| | | | 47/39 |
| 2006/0005466 A1* | 1/2006 | Atchley | A01G 9/024 |
| | | | 47/39 |
| 2015/0223412 A1* | 8/2015 | Vanderwall-Arnold | |
| | | | A01G 9/12 |
| | | | 47/45 |

* cited by examiner

FLOWER POT HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to holding devices and more particularly pertains to a new holding device for inhibiting a flower pot from tipping over when the flower pot is displayed.

BRIEF SUMMARY OF THE INVENTION

An embodiment of the disclosure meets the needs presented above by generally comprising a plurality of spikes that is each manipulated to penetrate a support surface. A cage is coupled to the plurality of spikes. The cage rests on the support surface when the spikes penetrate the support surface. A flower pot is selectively positioned in the cage thereby inhibiting the flower pot from tipping over.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
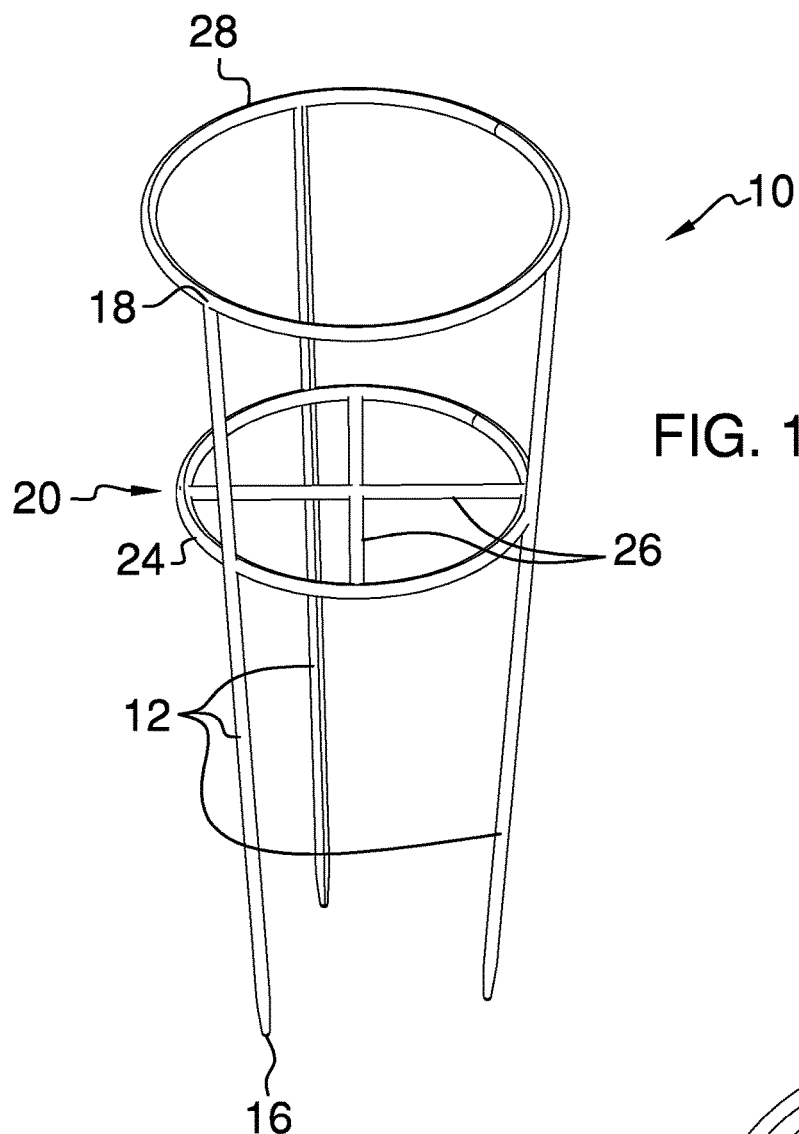
FIG. 1 is a perspective view of a flower pot holding assembly according to an embodiment of the disclosure.
Figure 2:
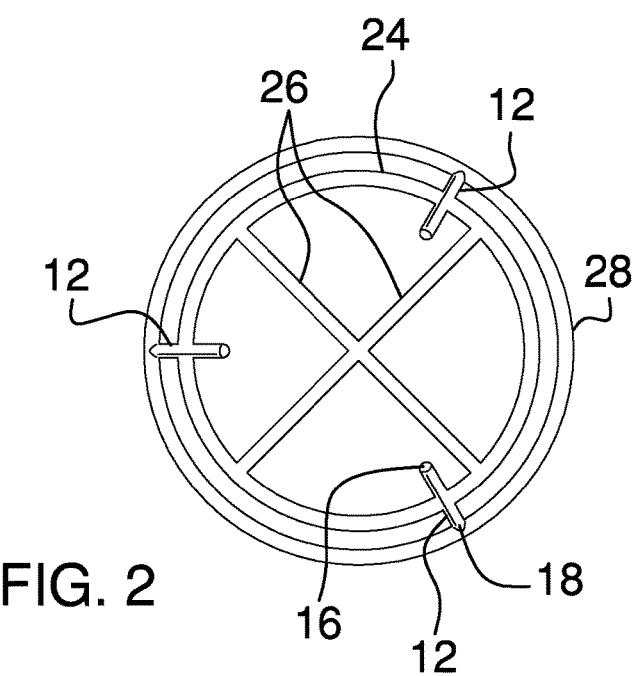
FIG. 2 is a bottom view of an embodiment of the disclosure.
Figure 3:
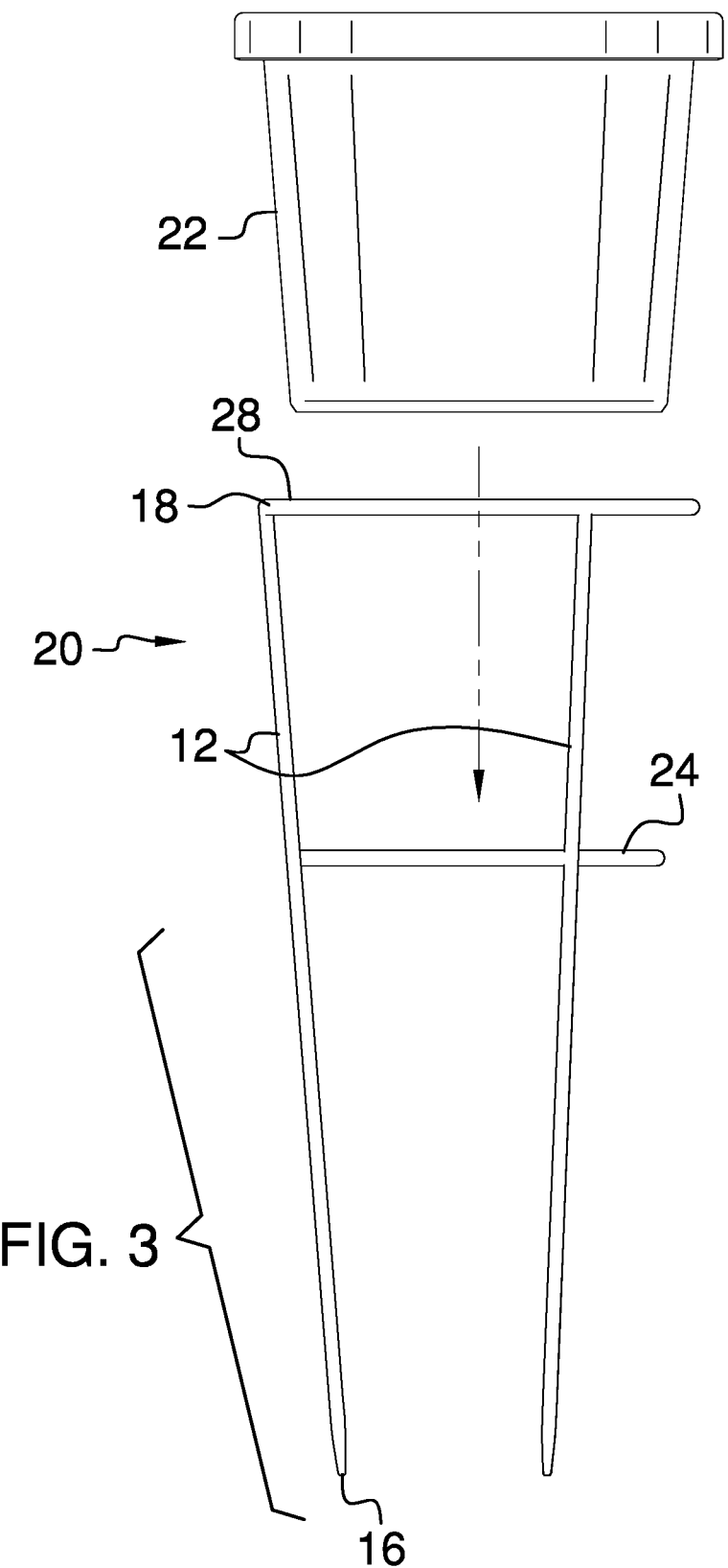
FIG. 3 is an exploded perspective view of an embodiment of the disclosure.
Figure 4:
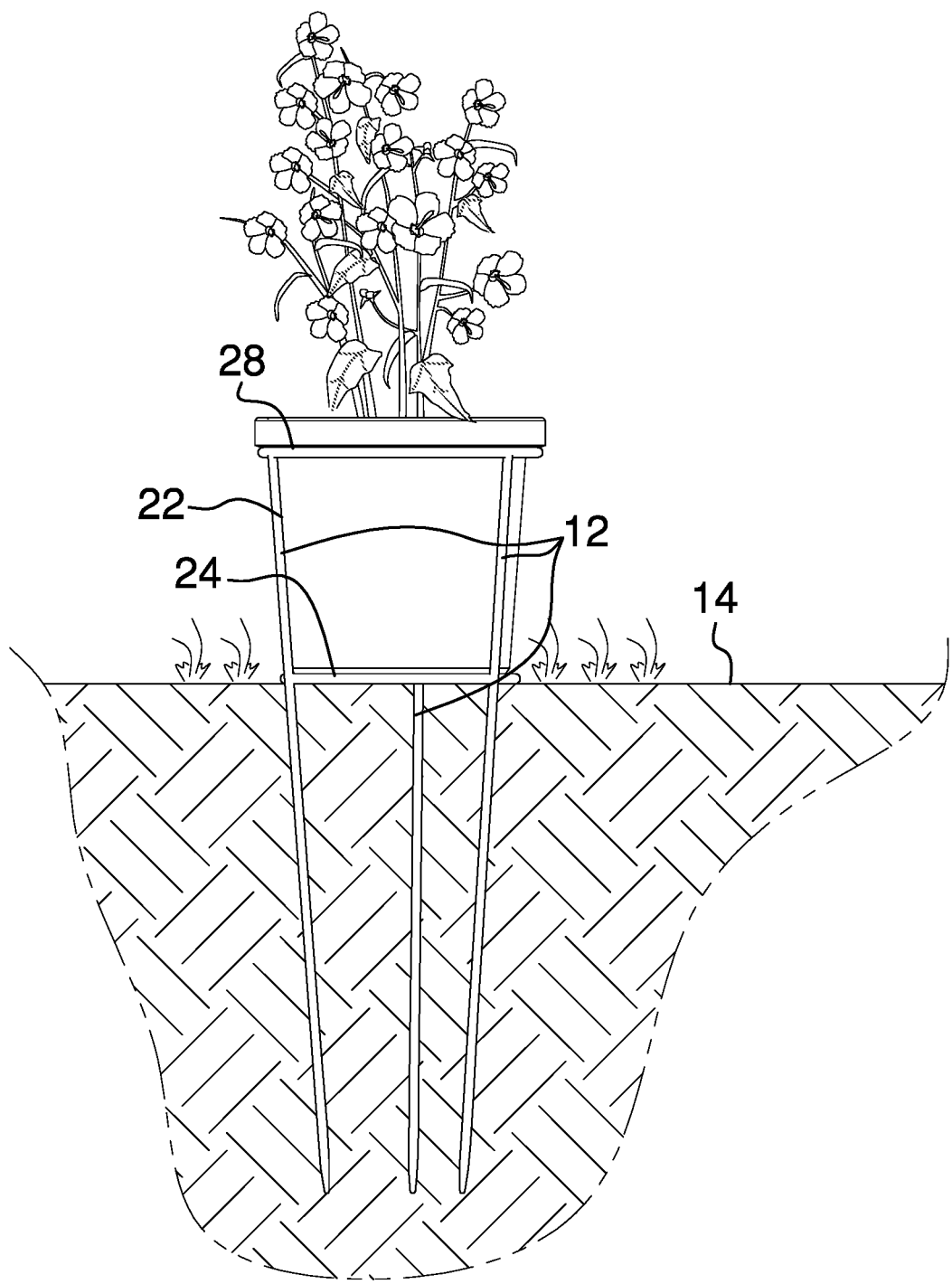
FIG. 4 is a perspective in-use view of an embodiment of the disclosure.

With reference now to the drawings, and in particular to FIGS. 1 through 4 thereof, a new holding device embodying the principles and concepts of an embodiment of the disclosure and generally designated by the reference numeral 10 will be described.

As best illustrated in FIGS. 1 through 4, the flower pot holding assembly 10 generally comprises a plurality of spikes 12. Each of the spikes 12 is manipulated penetrate a support surface 14 such as ground or the like having each of the spikes 12 being vertically oriented. Each of the spikes 12 has a first end 16 and a second end 18. Moreover, the first end 16 corresponding to each of the spikes 12 tapers to a point thereby enhancing penetrating the support surface 14. Each of the spikes 12 may have a length ranging between approximately 50.0 cm and 65.0 cm.

A cage 20 is coupled to the plurality of spikes 12 such the cage 20 rests on the support surface 14 when the spikes 12 are manipulated to penetrate the support surface 14. A flower pot 22 is selectively positioned in the cage 20 thereby inhibiting the flower pot 22 from tipping over. The flower pot 22 may be a flower pot placed on a grave as a memorial, a flower pot placed in a yard for ornamental display and any other type of flower pot. Moreover, the cage 20 may be comprised of a rigid material such as steel or the like.

The cage 20 comprises a first hoop 24 that is continuous such that the first hoop 24 forms a closed loop. The first hoop 24 is coupled to each of the spikes 12 and the spikes 12 are spaced apart from each other and are distributed around the first hoop 24. Moreover, the first hoop 24 is centrally positioned between the first 16 and second 18 ends of the plurality of spikes 12. A plurality of members 26 is each coupled to the first hoop 24. Each of the members 26 bisects a circle defined by the first hoop 24 and each of the members 26 supports the flower pot 22. Each of the members 26 intersects each other to form an X within the first hoop 24.

The cage 20 includes a second hoop 28 that is continuous such that the second hoop 28 forms a closed loop. The second hoop 28 is coupled to the second end 18 of each of the spikes 12. The second hoop 28 surrounds the flower pot 22 when the flower pot 22 is positioned on the members 26. In this way the flower pot 22 is inhibited from tipping in the cage 20. The second hoop 28 has a diameter that is greater than a diameter of the first hoop 24. Thus, each of the spikes 12 angles inwardly between the second end 18 and first end 16. The second hoop 28 may have a diameter ranging between approximately 50.0 cm and 65.0 cm.

In use, the cage 20 is manipulated to facilitate the first end 16 of each of the spikes 12 to penetrate the support surface 14 having the first hoop 24 resting on the support surface 14. The flower pot 22 is positioned in the cage 20 having the flower pot 22 resting on the members 26 and having the second hoop 28 surrounding the flower pot 22. In this way the flower pot 22 is inhibited from being tipped over by wind and the like. Additionally, the cage 20 retains the flower pot 22 for display purposes. The cage 20 is removed from the support surface 14 at any time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A flower pot holding assembly being configured to receive a flower pot thereby inhibiting the flower pot from tipping over, said assembly comprising:
   a plurality of spikes, each of said spikes being configured to penetrate a support surface; and
   a cage being coupled to said plurality of spikes wherein said cage is configured to rest on the support surface, said cage being configured to insertably receive the flower pot thereby inhibiting the flower pot from tipping over, said cage comprising:
      a first hoop being continuous such that said first hoop forms a closed loop, said first hoop being coupled to each of said spikes, said plurality of spikes being spaced apart from each other and being distributed around said first hoop, said first hoop being centrally positioned between a first end of each of said spikes and a second end of each of said spikes, and
      a plurality of members, each of said members being coupled to said first hoop and positioned entirely between upper and lower surfaces of said first hoop such that each of said members bisects a circle defined by said first hoop wherein each of said members is configured to support the flower pot, each of said members intersecting each other such that said plurality of members forms an X positioned entirely between said upper and lower surfaces of said first hoop.

2. The assembly according to claim 1, wherein said first end corresponding to each of said spikes tapering to a point.

3. The assembly according to claim 1, wherein said cage comprises a second hoop being continuous such that said second hoop forms a closed loop, said second hoop being coupled to said second end of each of said spikes wherein said second hoop is configured to surround the flower pot thereby inhibiting the flower pot from tipping in said cage.

4. The assembly according to claim 3, wherein
   said second hoop has a diameter being greater than a diameter of said first hoop such that each of said spikes angles inwardly between said second end and said first end.

5. A flower pot holding assembly being configured to receive a flower pot thereby inhibiting the flower pot from tipping over, said assembly comprising:
   a plurality of spikes, each of said spikes being configured to penetrate a support surface, each of said spikes being vertically oriented, each of said spikes having a first end and a second end, said first end corresponding to each of said spikes tapering to a point; and
   a cage being coupled to said plurality of spikes wherein said cage is configured to rest on the support surface, said cage being configured to insertably receive the flower pot thereby inhibiting the flower pot from tipping over, said cage comprising:
      a first hoop being continuous such that said first hoop forms a closed loop, said first hoop being coupled to each of said spikes, said plurality of spikes being spaced apart from each other and being distributed around said first hoop, said first hoop being centrally positioned between said first and second ends of said plurality of spikes,
      a plurality of members, each of said members being coupled to said first hoop and positioned entirely between upper and lower surfaces of said first hoop such that each of said members bisects a circle defined by said first hoop wherein each of said members is configured to support the flower pot, each of said members intersecting each other such that said plurality of members forms an X positioned entirely between said upper and lower surfaces of said first hoop, and
      a second hoop being continuous such that said second hoop forms a closed loop, said second hoop being coupled to said second end of each of said spikes wherein said second hoop is configured to surround the flower pot thereby inhibiting the flower pot from tipping in said cage, said second hoop having a diameter being greater than a diameter of said first hoop such that each of said spikes angles inwardly between said second end and said first end.

* * * * *